Oct. 15, 1968 W. W. CLARK 3,405,984
DISPLAY CASE
Filed Feb. 8, 1966 2 Sheets-Sheet 1
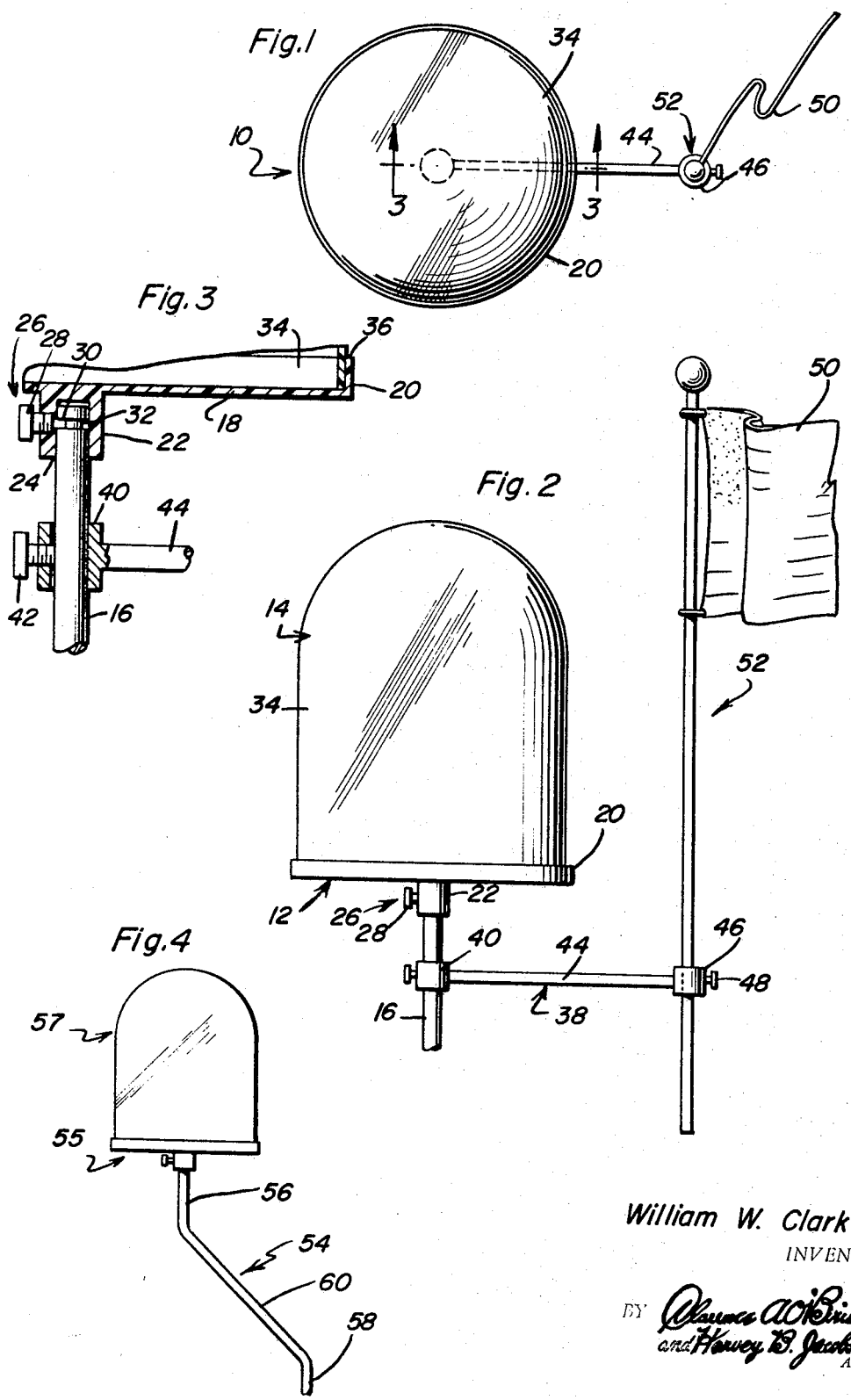
William W. Clark
INVENTOR.

Oct. 15, 1968   W. W. CLARK   3,405,984
DISPLAY CASE

Filed Feb. 8, 1966   2 Sheets-Sheet 2

William W. Clark
INVENTOR.

BY *Clarence A. O'Brien*
and *Harvey B. Jacobson*
Attorneys

United States Patent Office 3,405,984
Patented Oct. 15, 1968

3,405,984
DISPLAY CASE
William W. Clark, Pueblo, Colo.
(P.O. Box 187, Lamar, Colo. 81052)
Filed Feb. 8, 1966, Ser. No. 525,893
7 Claims. (Cl. 312—102)

ABSTRACT OF THE DISCLOSURE

An enclosed weatherproof display case including a rigid transparent dome mounted on a flat base which is in turn provided with a depending mounting leg having a bore therein which receives the upper end of a post or stud. The upper end of the post or stud is provided with an annular groove thereabout which receives the end of a setscrew in a manner so as to mount the base on the post or stud for rotation thereabout or fixed locking thereto. In one form of the invention the base is transparent and a light source is mounted therebeneath for an illumination of the contents of the display case.

---

This invention relates generally to display cases, and more particularly to several embodiments of novel display cases for exhibiting displays such as flowers, figurines, dolls, souvenirs, pictures, models or flags.

It is an object of the present invention to provide means for the exhibiting of various articles.

It is another object of the present invention to provide several embodiments of display cases which are substantially weatherproof and thus are useful either indoors or out of doors for the displaying of various articles.

It is a further object of the present invention to provide novel support means for a visual display case.

It is a still further object of the present invention to provide several embodiments of display cases which may be inexpensively fabricated out of readily available, lightweight materials, and which are extremely rugged and weather resistant while also presenting the displayed article in the most favorable position so that little or no attention is attracted to the case itself.

It is another object of the present invention to provide novel lighting means for the aforementioned display cases.

These objects are achieved basically through the provision of a transparent plastic dome mounted upon a base which includes a depending leg having a downwardly directed bore therein removably receiving the upper end of a post or stud. The upper end of the post or stud includes an annular groove thereabout for the reception of a setscrew which rotatably or fixedly mounts the base on the post or stud. In one form a source of light can be mounted beneath the base with the base being transparent so as to provide for an illumination of the contents of the display case. Further, a secondary support can be provided laterally of the display case for adjustably mounting a flag or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a first embodiment of display case constructed in accordance with the present invention;

FIGURE 2 is a front elevational view corresponding to the view illustrated in FIGURE 1;

FIGURE 3 is an enlarged partial vertical sectional view taken substantially on the plane of the line 3—3 of FIGURE 1;

FIGURE 4 is a view similar to that of FIGURE 2 illustrating a second preferred supporting means for use with the embodiment of the invention illustrated in FIGURES 1-3;

Figure 5:
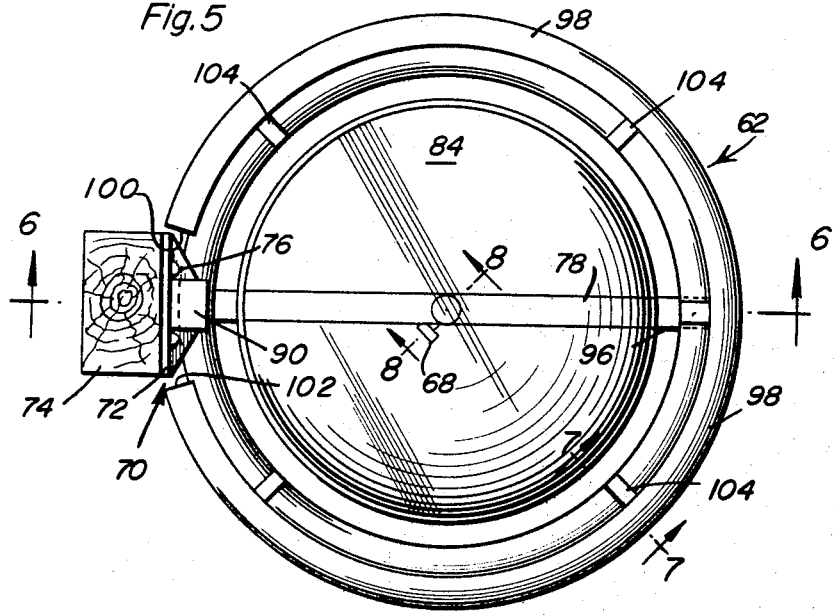
FIGURE 5 is a top plan view of a second preferred form of display case constructed in accordance with the present invention.

Referring now more particularly to the drawings, and especially to FIGURES 1-3, reference numeral 10 is used to generally denote the first embodiment of display case constructed in accordance with the present invention. The display case 10 comprises a base member generally denoted by the reference numeral 12 and a case generally denoted by the reference numeral 14, as well as a post 16 on which the base 12 is supported.

Referring specifically to FIGURES 2 and 3, it will be observed that the base member 12 comprises a circular plate-like base 18 having an upstanding peripheral flange portion 20 extending completely about the periphery of the base 18. A centrally located mounting leg 22 having a bottom opening chamber 24 therein extends downwardly from the bottom of base 18. A setscrew 26 is threadedly received in an opening in the side wall of leg 22, the setscrew 26 including an enlarged head 28 and a reduced forward end 30. The base member 12 is preferably integrally fabricated of an opaque or translucent rigid plastic material so as to be extremely lightweight while at the same time being quite sturdy in construction. It will be appreciated, of course, that other lightweight rigid sturdy material may be utilized for the base 12, and further, that it will be desirable to provide the base 12 with one of various desired colors.

The mounting post 16 is substantially circular in cross-section, and has a peripherally extending groove 32 adjacent the upper end thereof, the outer diameter of the post 16 being substantially equal to the diameter of chamber 24 of mounting leg 22. Thus, it will be most readily apparent from FIGURE 3, for example, that the reduced portion 30 of setscrew 26 may be threaded into the groove 32 in order to retain the base member 12 on the post 16. It will be observed that when the setscrew is threaded inwardly into the opening in mounting leg 22, the reduced portion will be received in the groove 32 in post 16 thereby holding the base member 12 thereon, while at the same time allowing the base member to be rotated with respect to the post 16, which post will normally be fixed in the ground, or in another horizontally extending supporting surface. Further, it will be possible to mount the base 12 in non-rotating position with respect to the post 16 merely by continuing to tighten down the setscrew 26 until the reduced portion 30 engages the post 16.

The case 14 comprises a rigid transparent plastic dome 34 which may be constructed in the same manner as a bell jar. The outer diameter of the bottom portion of the dome 34 is substantially equal to the inner diameter of the flange 20 and thus when the dome 34 is seated on the base member 12 as illustrated in FIGURES 2 and 3, for example, there will be a friction fit between the dome 34 and flange 20 as denoted by reference numeral 36, whereby the dome will be rigidly supported on the base and won't readily come off as for example in wind or rough weather. Thus, it will be readily appreciated from the foregoing that an article to be displaced, such as a souvenir, figurine or the like may be placed on the base 12 merely by removing the dome 34 after which the dome 34 will be replaced and, inasmuch as the dome 34 is transparent, and the base 12 is colored, the article will be readily visible therein and displayed in a most favorable manner.

Referring again to FIGURES 1–3, it will be observed that a flagpole supporting brace member generally denoted by reference numeral 38 is provided. The brace 38 includes a collar portion 40 having setscrew 42 threaded therein, as well as an arm portion 44 terminating in a second collar 46 having setscrew 48 therein. It will be appreciated from viewing FIGURES 2 and 3 in particular, that the collar 40 may be slid vertically along the post 16 and tightened down in a desired location, and a flag 50 may be supported in the collar 46 on flagpole or standard 52, the flagpole 52 being vertically adjustable with respect to the collar 46.

Referring now to FIGURE 4, it will be observed that a modified supporting post generally denoted by reference numeral 54 is provided for use with a base member 55 and dome 57 identical to those described immediately above. Thus, the post 54 includes first and second vertical sections 56 and 58 connected by an offset portion 60. It will be appreciated from a viewing of FIGURE 4 that the modified mounting post 55 will be useful when it is desired to mount the base 12 over a surface in which the bottom end of a straight post such as post 16 cannot be supported.

Referring now to FIGURES 5–8, a second preferred embodiment of the present invention is illustrated, and generally denoted by reference numeral 62. The display case 62 includes a base member generally referred to by reference numeral 64 which is similar to base member 12, except that it is constructed of transparent rather than opaque or translucent plastic material. The base member 64 includes the mounting leg 66 and set screw 68 identical to the leg 22 and setscrew 26 described above.

A mounting bracket generally denoted by reference numeral 70 is provided for supporting the base member 64. The bracket 70 includes a pair of perpendicular legs, the upper leg 72 being preferably mounted on a post 74 by conventional mounting means 76 or mounted on other suitable mounting surfaces and being approximately as wide as the post 74. The second leg 78 extends outwardly from the post 74 at right angles thereto and has a stud projecting upwardly therefrom at about the mid-section thereof. It will be appreciated, of course, that the mounting bracket 70 is constructed of rigid material such as quarter inch metal strap or the like. Thus, it will be seen that the base member 64 is mounted on the stud 80, which stud includes a peripherally extending groove 82 thereon in the same manner as the mounting of base member 12 on the post 16. Thus, the base member 64 may either be fixed by a setscrew 68 on the stud 80 or held thereon while being rotatable with respect thereto. Further, it will be apparent that the base member 64 is substantially identical to the base member 12 described above, and includes the peripherally extending flange 83 and plate-like base 85.

Figure 6:
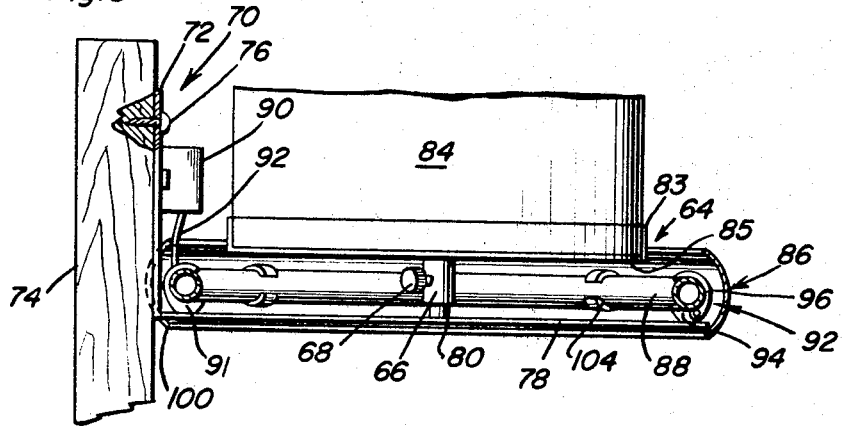
FIGURE 6 is a partial vertical sectional view taken substantially on the plane of the line 6—6 of FIGURE 5 with parts in elevation for purposes of illustration.
Figure 7:
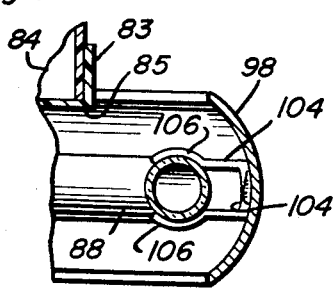
FIGURE 7 is an enlarged partial vertical sectional view taken substantially on the plane of the line 7—7 of FIGURE 5.
Figure 8:
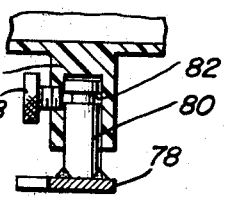
FIGURE 8 is an enlarged partial vertical sectional view taken substantially on the plane of the line 8—8 of FIGURE 5.

A case in the form of a dome member 84 of rigid transparent plastic similar to the dome 34 described above is provided, the dome 84 being frictionally retained within the flange 83. Thus, it will be apparent that the dome 84 when so seated on the base member 64, and, of course, also the dome 34 when it is seated on the base member 12, will provide a substantially weatherproof covering or case for the article supported on the base. It will further be apparent that the domes 34 and 84 may be of various heights and diameters, and of course, the base members 12 and 64 may also be varied in size as the domes vary. Referring now to FIGURES 5–7, it will be observed that a light shield or shade generally denoted by reference numeral 86 is mounted about the base 64, as is a fluorescent bulb 88. The fluorescent bulb 88 is in the form of a conventional ring-tube bulb and is connected to a ballast 90 by lead line 92, the ballast 90 being supported on the bracket plate or leg 72. A first open clamp member 91 is rigidly mounted on the leg 78 adjacent the bracket plate or leg 72, and a second clamp generally denoted by reference numeral 92 is mounted on the outboard end thereof. The clamp 92 includes a portion 94 fixedly mounted on leg 78 and a spring-biased portion 96, whereby the bulb 88 may be rigidly supported on the leg 78 by first being placed in clamp 91 and then sprung into the clamp leg 96. The light shade or shield 86 includes an inwardly concave body member 98 which is generally circular in configuration and has ends 100 and 102 split apart whereby it may be readily placed about a bulb 88. The shade 86 further includes a plurality of snap clamps 104 on the inside thereof, the clamps including legs 106 which are resiliently flexible and thus may be snapped about the bulb 88 thereby retaining the shade or shield in place completely about the base member 64. It will be readily apparent that the light energy emitted by bulb 88 will be directed upwardly through the transparent bottom wall 85 of base member 64 as well as through the dome 84 since both are transparent, thus focusing the light directly on the article contained in the display case 62 and minimizing the effect of the dome 84 and base 85. It will be appreciated, of course, that the fluorescent bulb and shield arrangement described above may be readily added to the embodiment of the invention described in relation to FIGURES 1–3 without undue modification thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A display case comprising a base member adapted to be supported in substantially parallel relationship to the ground, means for supporting said base member, a transparent case supported by said base member, and means for adjusting the relative rotational position between said base member and said supporting means, said base member including a peripherally extending upstanding flange, said case fitting within said flange in frictional engagement with the inside surface thereof, said base member being opaque, said base member including a centrally located depending leg, said supporting means comprising an elongate post adapted to be mounted in a supporting surface such as the ground, said post having a peripherally extending groove adjacent the upper end thereof, said depending leg including a post receiving pocket therein for receiving the upper end of said post, and a setscrew adapted to be threaded into said pocket and into said groove for retaining said base member on said post while allowing said base member to rotate relative to said post.

2. The combination of claim 1 wherein said post is substantially straight throughout its length.

3. The combination of claim 1 wherein said post includes an offset portion.

4. The combination of claim 1 including means mounted upon said post for supporting a standard in parallel relationship to said post, means for adjustably mounting said supporting means on said post, and means for adjustably mounting said standard in said supporting means.

5. A display case comprising a base member adapted to be supported in substantially parallel relationship to the ground, means for supporting said base member, a transparent case supported by said base member, and means for adjusting the relative rotational position between said base member and said supporting means, said base member including a peripherally extending upstanding flange, said base fitting within said flange in frictional engagement with the inside surface thereof, said supporting means comprising a bracket adapted to be mounted on a suitable vertical supporting surface, said bracket including a leg portion extending at substantially right angles to the supporting surface, and upstanding stud on said leg portion, said base member mounted on said stud.

6. The combination of claim 5 wherein said stud includes a peripherally extending groove adjacent the upper end thereof, said base member including a supporting leg having a stud-receiving chamber therein, a setscrew threadedly received in said supporting leg, said setscrew including a reduced forward end portion adapted to be received in said groove wereby said base member will be retained on said stud and rotatable thereon.

7. The combination of claim 5 including a substantially circular light energy source mounted on said leg portion about said base member, light shield means mounted on said light energy source about said base member, said base member being transparent whereby light energy emitted by said light energy source will be directed upwardly through said base member by said light shield means.

References Cited

UNITED STATES PATENTS

| | | | |
|---|---|---|---|
| 313,766 | 3/1885 | Press | 211—165 |
| 1,360,376 | 11/1920 | Douthit | 312—252 X |
| 1,600,132 | 9/1926 | Pearl | 312—284 X |
| 2,047,516 | 7/1936 | Lutsche | 312—252 X |
| 2,667,287 | 1/1954 | Cook | 312—284 X |
| 2,692,808 | 10/1954 | Marsh | 312—284 X |
| 2,772,500 | 12/1956 | Cole | 312—284 X |

CHANCELLOR E. HARRIS, *Primary Examiner.*